United States Patent
Platakis et al.

(10) Patent No.: US 10,366,359 B2
(45) Date of Patent: Jul. 30, 2019

(54) AUTOMATIC EXTRACTION AND COMPLETION OF TASKS ASSOCIATED WITH COMMUNICATIONS

(71) Applicant: MICROSOFT TECHNOLOGY LICENSING, LLC, Redmond, WA (US)

(72) Inventors: Manolis Platakis, Oslo (NO); Ievgeniia Zhovtobriukh, Oslo (NO); Christos Makris, London (GB); Olivia Ifrim, Oslo (NO); Daniela Lepri, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 549 days.

(21) Appl. No.: 14/944,245

(22) Filed: Nov. 18, 2015

(65) Prior Publication Data
US 2017/0140318 A1    May 18, 2017

(51) Int. Cl.
*G06Q 10/00* (2012.01)
*G06Q 10/06* (2012.01)

(52) U.S. Cl.
CPC ... *G06Q 10/06316* (2013.01); *G06Q 10/0631* (2013.01)

(58) Field of Classification Search
CPC .................. G06Q 10/0631; G06Q 10/06316
See application file for complete search history.

(56) References Cited

U.S. PATENT DOCUMENTS

| | | | | |
|---|---|---|---|---|
| 5,923,552 A | * | 7/1999 | Brown | G06Q 10/06 700/100 |
| 6,470,333 B1 | * | 10/2002 | Baclawski | G06F 17/3033 |
| 6,823,325 B1 | * | 11/2004 | Davies | G06F 17/271 706/50 |
| 7,007,067 B1 | * | 2/2006 | Azvine | G06F 3/011 709/202 |
| 7,330,895 B1 | * | 2/2008 | Horvitz | G06Q 10/10 455/414.1 |
| 7,644,144 B1 | * | 1/2010 | Horvitz | G06Q 10/10 709/203 |

(Continued)

OTHER PUBLICATIONS

"Discovering collaborative knowledge-intensive processes through e-mail mining", DC Soares, FM Santoro, FA Baião—Journal of Network and Computer . . . , 2013—Elsevier.*

(Continued)

*Primary Examiner* — Jonathan G Sterrett
(74) *Attorney, Agent, or Firm* — Liang IP, PLLC

(57) ABSTRACT

Automatically extracting and completing tasks associated with a communication is provided. In some examples, an application, such as a task management application, may generate nodes based on properties extracted from a communication, generate tasks based on the nodes, and construct a graph based on the nodes and the tasks. The task management application may also perform a prioritization of the tasks within the graph based on the properties of the nodes, order the tasks within the graph based on the prioritization of the tasks, and provide a task management interface to present the tasks within the graph. The task management application may also transmit the tasks within the graph to a task extraction engine of the task management application in response to a modification input executed on the graph.

20 Claims, 7 Drawing Sheets

(56) References Cited

U.S. PATENT DOCUMENTS

| | | | | |
|---|---|---|---|---|
| 7,912,701 | B1* | 3/2011 | Gray | G06F 17/27 704/257 |
| 8,032,553 | B2 | 10/2011 | Lippe et al. | |
| 8,326,859 | B2 | 12/2012 | Paek et al. | |
| 8,738,611 | B1* | 5/2014 | Zarmer | G06Q 10/107 707/723 |
| 8,892,624 | B2* | 11/2014 | Branson | G06F 9/5072 709/201 |
| 8,989,053 | B1* | 3/2015 | Skaaksrud | H04W 12/06 370/255 |
| 2002/0174199 | A1* | 11/2002 | Horvitz | G06Q 10/107 709/220 |
| 2002/0198994 | A1* | 12/2002 | Patton | H04B 10/1149 709/225 |
| 2005/0192992 | A1 | 9/2005 | Reed et al. | |
| 2005/0254518 | A1* | 11/2005 | Fujimori | H04L 69/08 370/466 |
| 2005/0278362 | A1* | 12/2005 | Maren | G06F 17/30943 |
| 2006/0067252 | A1* | 3/2006 | John | G06Q 10/06 370/261 |
| 2006/0080267 | A1 | 4/2006 | Nelken | |
| 2007/0135936 | A1 | 6/2007 | Dumas et al. | |
| 2007/0189509 | A1* | 8/2007 | Foody | H04L 67/2823 380/2 |
| 2008/0068217 | A1* | 3/2008 | Van Wyk | G01D 4/004 340/870.11 |
| 2008/0195602 | A1* | 8/2008 | Keller | G06F 17/30867 |
| 2009/0006156 | A1* | 1/2009 | Hunt | G06Q 10/063 705/7.11 |
| 2010/0112955 | A1* | 5/2010 | Krishnaswamy | G06F 1/3203 455/67.11 |
| 2011/0007897 | A1* | 1/2011 | Kodama | H04L 12/40006 380/255 |
| 2011/0035347 | A1* | 2/2011 | Shama | G06Q 30/02 706/21 |
| 2011/0145823 | A1* | 6/2011 | Rowe | G06Q 10/109 718/100 |
| 2011/0282969 | A1* | 11/2011 | Iyer | G06F 17/3056 709/217 |
| 2012/0159506 | A1* | 6/2012 | Barham | G06F 9/5044 718/104 |
| 2012/0221621 | A1* | 8/2012 | Sugawara | H04L 69/16 709/201 |
| 2012/0331101 | A1* | 12/2012 | Itaya | H04L 12/5885 709/217 |
| 2013/0007648 | A1 | 1/2013 | Gamon et al. | |
| 2013/0081142 | A1* | 3/2013 | McDougal | G06F 21/554 726/24 |
| 2013/0173573 | A1 | 7/2013 | Song et al. | |
| 2013/0185092 | A1* | 7/2013 | Dubbels | G06Q 50/22 705/2 |
| 2013/0218836 | A1 | 8/2013 | Sullivan et al. | |
| 2014/0052791 | A1* | 2/2014 | Chakra | H04L 51/12 709/206 |
| 2014/0129942 | A1* | 5/2014 | Rathod | H04N 21/44222 715/720 |
| 2014/0156251 | A1* | 6/2014 | Kim | G06F 17/5022 703/21 |
| 2014/0195449 | A1 | 7/2014 | Komissarchik et al. | |
| 2014/0215472 | A1 | 7/2014 | Motahari Nezhad et al. | |
| 2014/0222738 | A1* | 8/2014 | Joyce | G06N 3/10 706/13 |
| 2015/0039704 | A1 | 2/2015 | Kursun | |
| 2015/0106420 | A1* | 4/2015 | Warfield | H04L 41/5041 709/201 |
| 2015/0215253 | A1 | 7/2015 | Vemuri et al. | |
| 2015/0341300 | A1* | 11/2015 | Swain | H04L 51/22 707/738 |
| 2016/0034305 | A1* | 2/2016 | Shear | G06F 9/50 707/722 |
| 2016/0234099 | A1* | 8/2016 | Jiao | H04L 45/02 |
| 2016/0321104 | A1* | 11/2016 | Fang | G06F 9/4881 |
| 2017/0193349 | A1* | 7/2017 | Jothilingam | G06N 3/006 |
| 2017/0344631 | A1* | 11/2017 | Thirumalai-Anandanpillai | G06F 17/30696 |
| 2017/0344649 | A1* | 11/2017 | Vinnakota | G06F 17/30958 |

OTHER PUBLICATIONS

"Improving email response in an email management system using natural language processing based probabilistic methods" A Al-Alwani—Journal of Computer Science, 2015—researchgate.net.*

Semantic data mining: A survey of ontology-based approaches D Dou, H Wang, H Liu—Semantic Computing (ICSC), 2015 . . . , 2015—ieeexplore.ieee.org.*

Graph-based ranking algorithms for e-mail expertise analysis B Dom, I Eiron, A Cozzi, Y Zhang—Proceedings of the 8th ACM SIGMOD . . . , 2003—dl.acm.org.*

An Analysis of Congruence Gaps and Their Effect on Distributed Software Development K Ehrlich, M Helander, G Valetto, S Davies, C Williams—2008—researchgate.net.*

Organizational knowledge sharing through mind mapping ET Jeungtai, C Chiang—Fuzzy Systems and Knowledge . . . , 2009—ieeexplore.ieee.org.*

Discovery and analysis of e-mail-driven business processes M Stuit, H Wortmann—Information Systems, 2012—Elsevier.*

Integrating various views in Mind Mapping Tool RV Patil, N Singhal, S Shaikh, B Shidore . . . - . . . (IACC), 2014 IEEE . . . , 2014—ieeexplore.ieee.org.*

Let Me Tell You a Story-On How to Build Process Models. JC de AR Gonçalves, FM Santoro, FA Baião—J. UCS, 2011—jucs.org.*

"International Search Report and Written Opinion Received for PCT Application No. PCT/US2016/061781", dated Jan. 23, 2017, 14 Pages.

Kokkalis, et al., "EmailValet: Managing Email Overload through Private, Accountable Crowdsourcing", In Proceedings of the conference on Computer supported cooperative work, Feb. 23, 2013, 10 pages.

Kalia, et al., "Identifying Business Tasks and Commitments from Email and Chat Conversations", In Technical Report of HPL-2013-4, Feb. 6, 2013, 22 pages.

Oramas, et al., "Automatic Creation of Knowledge Graphs from Digital Musical Document Libraries", In Proceedings of the 9th Conference on Interdisciplinary Musicology, May 11, 2014, 4 pages.

Tang, et al., "Email Mining: Tasks, Common Techniques, and Tools", In Journal of Knowledge and Information Systems, vol. 41, Issue 1, Oct. 2014, 36 pages.

* cited by examiner

AUTOMATIC EXTRACTION AND COMPLETION OF TASKS ASSOCIATED WITH COMMUNICATIONS

BACKGROUND

In a networked environment, communications may be routed from a source computing device over a network to a target computing device. An application executed on the target computing device may extract tasks associated with a project from the communications. The application may organize the tasks in calendars and tables, for example. The application may enable people to track progress of individual tasks, as well as track the progress of an overall project. However, tracking the progress of the induvial tasks and/or the overall project may be difficult, as the application may receive the communications from multiple sources, such as from email communications, text messaging communications, instant messaging communications, etc. Further, the communications may additionally be received in many different forms, such as graphical communications, audio communications, and textual communications, among others.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed at automatically extracting and completing tasks associated with a communication. In some examples, an application, such as a task management application, may generate nodes based on properties extracted from a communication, generate tasks based on the nodes, and construct a graph based on the nodes and the tasks. The task management application may also perform a prioritization of the tasks within the graph based on the properties of the nodes, order the tasks within the graph based on the prioritization of the tasks, and provide a task management interface to present the tasks within the graph. The task management application may also transmit the tasks within the graph to a task extraction engine of the task management application in response to a modification input executed on the graph.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
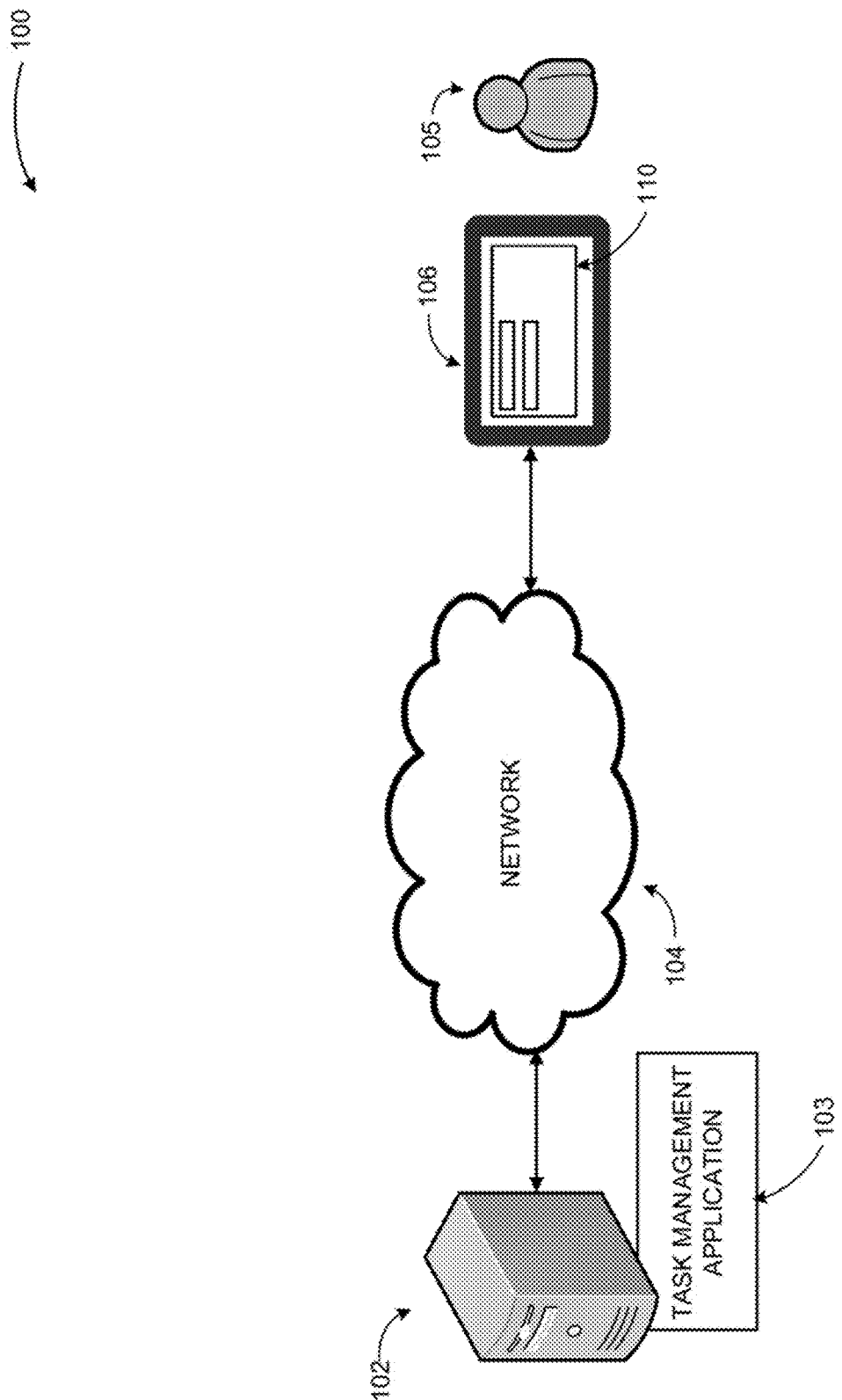
FIG. 1 is a conceptual diagram illustrating an example computing environment for automatically extracting and completing tasks associated with a communication, according to embodiments.

As briefly described above, automated extraction and completion of tasks associated with a communication may be provided. In some examples, an application, such as a task management application, may provide automatic task extraction and completion from a communication. The task management application may generate nodes based on properties extracted from the communication, generate tasks based on the nodes, and construct a graph based on the nodes and the tasks. The task management application may also perform a prioritization of the tasks within the graph based on the properties of the nodes, order the tasks within the graph based on the prioritization of the tasks, and provide a task management interface to present the tasks within the graph. The task management application may also transmit the tasks within the graph to a task extraction engine of the task management application in response to a modification input executed on the graph.

Furthermore, the task management application may perform a historical trend analysis to analyze a history of the properties of the nodes. The properties may include a priority associated with the communication, a priority associated with a source of the communication, a timestamp associated with the communication, a subject matter associated with the communication, and/or a type of an attachment associated with the communication, among others. The task management application may perform the prioritization of the tasks based on the history of the properties of the nodes.

In another example scenario, the task management application may order the tasks based on a deadline associated with the tasks and present a subset of the tasks on the task management interface. An input may be requested to approve, to dismiss, or to tentatively approve the subset of the tasks. After receiving the approval of the subset of the tasks, the subset of the tasks may be executed. After receiving a dismissal of the subset of the tasks, the subset of the tasks may be deleted. After receiving a tentative approval of the subset of the tasks, the subset of the tasks may be executed in response to a deadline associated with the subset of the tasks.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automatically extracting and completing tasks associated with a communication. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using tasks herein, embodiments are not limited to tasks. Automatically extracting and completing tasks associated with a communication may be implemented in other environments, such as instant messages, data sharing, application sharing, online conferencing, and similar communications, where task data may be exchanged.

The technical advantages of automatically extracting and completing tasks associated with a communication may include, among others, increased efficiency of user interactions, task presentation, and prioritization. Processing and network bandwidth usage may also be reduced by avoiding repeated task assignment changes, for example when tasks or resources have to be re-allocated. The initial establishment of the nodes to form the tasks may also be optimized through implementing a learning based mechanism and/or a learning based scheme to modify the assignments of the nodes to the tasks based on past behaviors.

Embodiments address a need that arises from very large scale of operations created by networked computing and cloud based services that cannot be managed by humans. The actions/operations described herein are not a mere use of a computer, but address results of a system that is a direct consequence of software used as a service such as task services offered in conjunction with the tasks.

FIG. 1 is a conceptual diagram illustrating an example computing environment for automatically extracting and completing tasks associated with a communication, according to embodiments.

As shown in a diagram 100, a computing device 102 may execute a task management application 103. The task management application may include a task extraction engine and a task modification engine, among others. The computing device 102 may include a physical server, a special purpose computing device, a datacenter, and/or a data warehouse, among others.

The task extraction engine of the task management application 103 may generate nodes based on properties extracted from a communication. The communication may include an email, an instant message, an audio communication, a graphical communication, a visual communication, an online calendar invite, an attachment associated with an email, and/or a text message, among other forms of communication. The task extraction engine may also compile task data and the tasks associated with the communication. The task management application 103 may also analyze scenarios associated with the tasks and may visualize various aspects of the communication, such as schedules, resource allocations, and/or similar ones using visual tools like Gantt charts, calendars, tables, and/or comparable ones.

The computing device 102 may include a networking device, a memory, and one or more processors. The task management application 103 may utilize the networking device of the computing device 102 to interact with other devices, such as a client device 106. The client device 106 may include a desktop computer, a laptop computer, a tablet, a smart phone, and/or a wearable computer, among others. The client device 106 may display a task management interface of the task management application 103 through a client interface 110. A target stakeholder 105 may interact with the task management application 103 through the task management interface displayed within the client interface 110. The client interface 110 may render the task management interface of the task management application 103. Alternatively, the client interface 110 may include the task management interface of the task management application 103.

The computing device 102 may communicate with the client device 106 through a network 104. The network 104 may provide wired or wireless communications between nodes, such as the computing device 102 or the client device 106. The task management application 103 may also be provided by a third-party service, such as a task management service, web applications, and/or a datacenter service, among others.

In some examples, the information, the tasks, and the resources may be displayed as a presentation on the task management interface 110. Furthermore, conventional and intrinsic task management fields, such as a percentage complete, may be used for automatic placement of specific tasks into appropriate columns on the task management interface 110.

While the example system in FIG. 1 has been described with specific components including the computing device 102 and the task management application 103, embodiments are not limited to these components or system configurations and can be implemented with other system configuration employing fewer or additional components.

Figure 2:
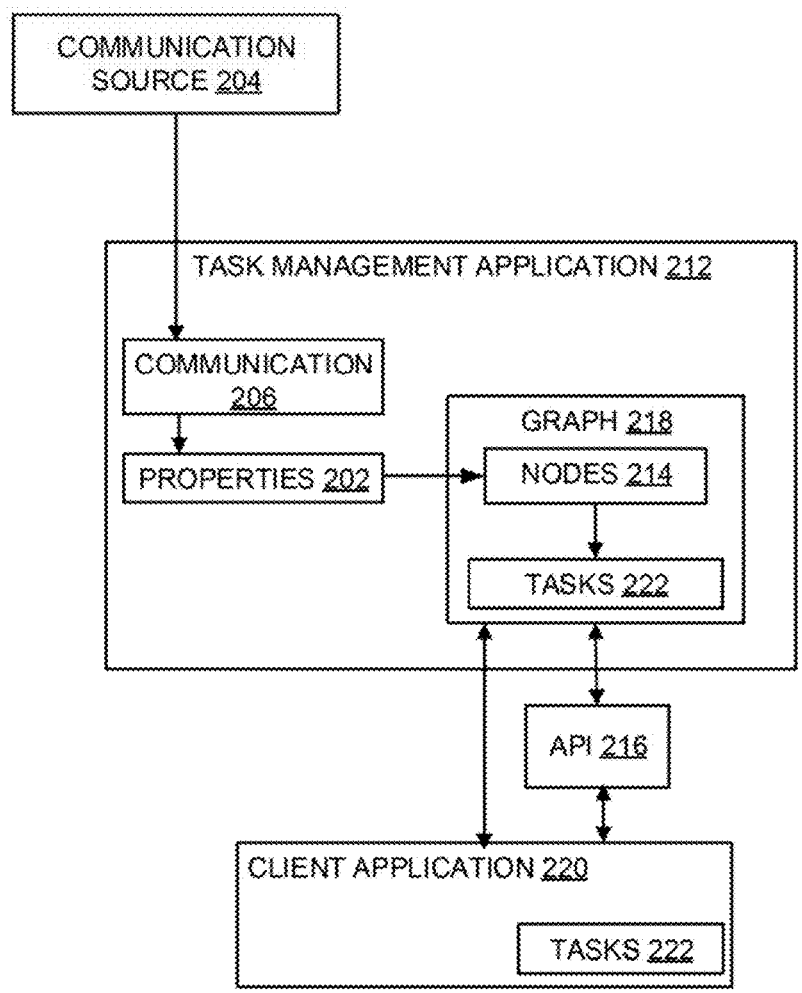
FIG. 2 is an architectural diagram illustrating components of a scheme to automatically extract and complete tasks associated with a communication, according to embodiments.

FIG. 2 is an architectural diagram illustrating components of a scheme to automatically extract and complete tasks associated with a communication, according to embodiments.

In a diagram 200, a communication source 204 may include a computing device that manages communications such as emails, and/or messages, among others. The task management application 212 may include a task extraction engine and a task modification engine, among others. The task extraction engine may process a communication 206 received from the communication source 204. The task extraction engine may process the communication 206 by extracting properties 202 of the communication 206 and generating nodes 214 based on the properties 202.

Tasks 222 may be generated based on the nodes 214. The task extraction engine of the task management application 212 may construct a graph 218 based on the nodes 214 and the tasks 222. The graph 218 may include an ordered pair of a set of vertices or the nodes 214. The nodes 214 may be connected with edges or arcs. In an example, the graph 218 may be an undirected graph. The undirected graph may not have a distinction between two nodes associated with each edge. In another example, the graph 218 may be a directed graph that includes edges directed from a node to another node.

A degree may be associated with the nodes 214. The degree is a number of edges incident to the nodes 214. In the undirected graph, an isolated node is one of the nodes 214 with a degree of zero. In another example, a pendant node or a leaf node is one of the nodes 214 with a degree of one. In the directed graph, the nodes 214 can be distinguished by an outdegree and an indegree. The outdegree is a number of outgoing edges from one of the nodes 214. The indegree is a number of incoming edges from one of the nodes 214. Some examples of nodes include a source node, a sink node, a simplicial node, and a universal node, among others. The source node is one of the nodes 214 with the indegree of zero. The sink node is one of the nodes 214 with the outdegree of zero. The simplicial node is one of the nodes 214 whose neighbors form a clique, where every two neighbors are adjacent. The universal node is one of the nodes 214 that is adjacent to every other node in the graph 218.

The task modification engine of the task management application 212 may perform a prioritization of the tasks 222 within the graph 218 based on the properties 202 of the nodes 214 and may order the tasks 222 within the graph 218 based on the prioritization of the tasks 222. The properties 202 may include a priority associated with the communication, a priority associated with a source of the communication (i.e. a source stakeholder), a timestamp associated with the communication, a subject matter associated with the communication, and a type of an attachment associated with the communication. In other examples, the tasks 222 may also be ordered in an ascending order or a descending order based on a deadline associated with the tasks 222. In other examples, the tasks 222 may be ordered based on a numeric variable, a string variable, or a factor variable associated with the tasks 222.

The task modification engine of the task management application 212 may provide a task management interface to present the tasks 222 within a graph 218. The task management interface may be used to visualize the tasks 222 employing a grid of columns reflecting the state of a given task (e.g., not started, in progress, ready for testing signoff, completed, etc.) and rows representing aggregations of the tasks 222 (summary tasks, or "stories").

In another example, the task modification engine of the task management application 212 may provide, through an application programming interface (API) 216, the task management interface to the client application 220 to present the tasks 222 within the graph 218. The API 216 may be a set of routines, protocols, and tools for an application (i.e. the task management application 212) that enables the application (i.e. the task management application 212) to interact or communicate with one or more other applications and services managed by separate entities. The API 216 may also be configured to extract task data from the properties 202 of the communication 206 and extract the task data from the nodes 214. The task management application 212 may utilize an algorithm, such as a task extraction algorithm, to facilitate the transfer of the tasks 222 and the nodes 214 to the graph 218.

The API 216 may query the graph 218 to structure task data, extracted from the properties 202 of the communication 206, in a graphical format. In some examples, the graph 218 may be populated by the one or more other applications and services managed by the separate entities. In other examples, the API 216 may be a web service API that adheres to Representational State Transfer (REST) architectural constraints (e.g., a RESTful API).

An example of the graphical format may include a tree structure. In some examples, the graph 218 may be configured as an extension to the API 216. The graph 218 may enable third party applications to utilize the nodes 214 and the tasks 222 by connecting to the graph 218. Further, the graph 218 may act as a persistence layer to provide the API 216 to other applications and/or the services.

The tree structure may be defined locally as a collection of the nodes 214, where each of the nodes 214 is a data structure consisting of a value, together with a list of references to the nodes 214 with constraints that no reference is duplicated. The API 216 may use the tree structure to associate the nodes 214 in the graph 218, in examples. The association of the nodes 214 in the graph 218 may result in one of the tasks 222. In examples, the association of the nodes 214 in the graph 218 may occur by a one-to-one translation of the properties 202 of the nodes 214 or a one-to-many translation of the properties 202 of the nodes 214, among other examples. Examples of the tree structure may include a binary search tree (BST), a red-black tree, an AVL tree, and an R-tree, among others.

If the properties 202 cannot be provided for the nodes 214, for example, default properties may be assigned to the nodes 214. In further examples, the tree structure may be annotated with the properties 202 associated with the nodes 214 and may be rendered as a document, a web page, and a selectable tree view through the task management application 212. In some examples, the association of the nodes 214 in the graph 218 may be customizable.

In some examples, the information, the tasks, and the resources may be displayed as a presentation on the task management interface. Furthermore, conventional and intrinsic task management fields, such as a percentage complete, may be used for automatic placement of specific tasks into appropriate columns on the task management interface.

Figure 3:
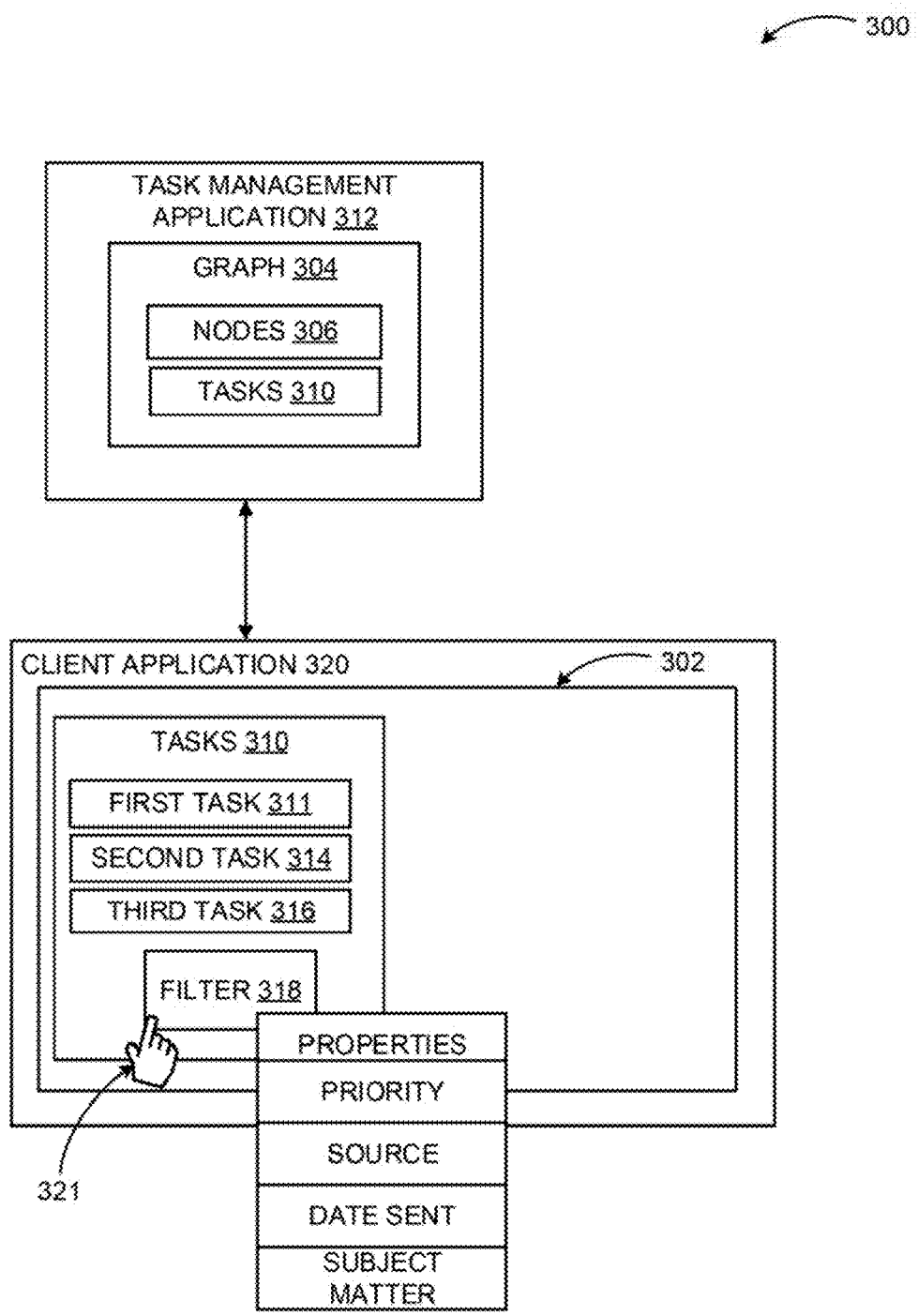
FIG. 3 is a display diagram illustrating components of a task management application that automatically extracts and completes tasks associated with a communication, according to embodiments.

FIG. 3 is a display diagram illustrating components of a task management application that automatically extracts and completes tasks associated with a communication, according to embodiments.

In a diagram 300, a task extraction engine of a task management application 312 may construct a graph 304 based on nodes 306 extracted from a communication and tasks 310 generated based on an association of the nodes 306. A task modification engine of the task management application 312 may perform a prioritization of the tasks 310 within the graph 304 based on properties of the nodes 306 and may order the tasks 310 within the graph 304 based on the prioritization of the tasks 310. The tasks 310 may also be ordered in an ascending order or a descending order based on a deadline associated with the tasks 310. In other examples, the tasks 310 may be ordered based on a numeric variable, a string variable, or a factor variable associated with the tasks 310.

The task modification engine of the task management application 312 may provide a task management interface 302 to the client application 320 to present the tasks 310 within the graph 304. The task management interface 302 may be used to visualize the tasks 310 employing a grid of columns reflecting the state of a given task (e.g., not started, in progress, ready for testing signoff, completed, etc.) and rows representing aggregations of the tasks 310 (summary tasks, or "stories"). The task management interface 302 may display task data, the tasks 310, resources, and information associated with the tasks 310 to a target stakeholder associated with the client application 320. The tasks 310 may include a first task 311, a second task 314, and a third task 316. The task modification engine of the task management application 312 may perform various computations, analyses, and visualization operations associated with the resources and the tasks 310.

In examples, the task extraction engine of the task management application 312 may process a qualification of a subset of the nodes 306 to exceed a threshold to generate one of the tasks 310. The threshold, in examples, may be based on an urgency associated with the communication and an urgency associated with an attachment of the communication, among others. The qualification may include a prior history associated with a completion of the task, among other qualifications. The task extraction engine of the task management application 312 may detect the qualification of the subset of the nodes 306 exceeding the threshold.

The task extraction engine of the task management application 312 may wait for an allocation of the subset of the nodes 306 to the task during a time period. The task extraction engine may detect the allocation of the subset of the nodes 306 to the task during the time period and in response, the task extraction engine may generate the task based on the subset of the nodes 306. An alert may be transmitted to the task management interface 302 of the client application 320 to indicate a creation of the task.

In further examples, the task extraction engine may implement a learning mechanism to associate the subset of the nodes 306 to generate one of the tasks 310. The learning mechanism may include text extraction operations, task identification operations, and analysis operations to identify a history of past behavior associated with the target stakeholder. The history of past behavior may include the history of associating the properties of the subset of the nodes 306 to one of the tasks 310. The learning mechanism may further include additional analysis operations to identify another history of the past behavior associated with other stakeholders. The other history of the past behavior may include the history of associating the properties of the subset of the nodes 306 to one of the tasks 310 of the other stakeholders.

In examples, the text extraction operations may involve detecting similar text, linguistic phrases, and/or keywords in the properties of the nodes 306. The task extraction engine of the task management application 312 may associate the nodes 306 having similar textual properties, similar linguistic phrases, and/or similar keywords into one of the tasks 310. In other examples, the task extraction engine may analyze the other history of the past behavior of the other stakeholders. In response to analyzing the other history, the task extraction engine may associate the subset of the nodes 306 to one of the tasks 310. In a further example, the task extraction engine of the task management application 312 may associate the subset of the nodes 306 having similar metadata properties into one of the tasks 310.

In another example, the task modification engine of the task management application 312 may receive a feedback associated with a subset of the tasks 310 (i.e. the first task 311 and the second task 314) and/or the prioritization of the subset of the tasks 310 (i.e. the first task 311 and the second task 314) from the target stakeholder. The feedback may include the communication, an audio communication, a visual communication, an attachment to the communication, a text message, and/or an instant message, among others. The task modification engine may customize the subset of the tasks 310 (i.e. the first task 311 and the second task 314) and/or the prioritization of the subset of the tasks 310 (i.e. the first task 311 and the second task 314) based on the feedback.

In another example, the task modification engine may customize the subset of the tasks 310 (i.e. the first task 311 and the second task 314) based on a received response from the target stakeholder. For example, if the target stakeholder performs an action to dismiss the subset of the tasks 310 (i.e. the first task 311 and the second task 314) more than a default number of times (i.e. three times), the task extraction engine may utilize the learning mechanism to modify the operations utilized to associated the subset of the nodes 306 to generate one of the tasks 310.

In another example, the subset of the nodes 306 may fail to be associated to generate one of the tasks 310. The task extraction engine may detect the failure and may be enabled to utilize default properties associated with the subset of the nodes 306 to generate one of the tasks 310. The learning mechanism may customize the operations utilized to associate the subset of the nodes 306 to prohibit this situation from arising again.

In other examples, the task extraction engine may wait for an allocation of the subset of the nodes 306 to one of the tasks 310 during a time period. In response to detecting the allocation of the subset of the nodes 306 to one of the tasks 310 during the time period, the task extraction engine of the task management application 312 may prevent the subset of the nodes 306 from being allocated to another task during the time period. In examples, the subset of the nodes 306 may be prohibited from overlapping with the other task during the time period. The task extraction engine may generate one of the tasks 310 based on the subset of the nodes 306. An alert may be transmitted through the task management interface 302 to indicate a creation of one of the tasks 310.

In another example, the task extraction engine may perform a verification process during the generation of the tasks 310 to determine if a first node associated with the first task 311 is additionally allocated to the second task 314. In response to a determination, from the verification process, that the first node is allocated to the second task 314, the task extraction engine may release the first node from the second task 314. A completion of the first task 311 may be detected and the task extraction engine may re-assign the first node to the second task 314.

In a further example, the task extraction engine may receive a move request to move a first node associated with the first task 311 to the second task 314. The task extraction engine may determine that the first node meets a threshold for creation of the first task 311. The threshold may include a type of the communication, a type of metadata associated with the communication, and the source stakeholder of the communication, among others. The task modification engine may transmit a notification to the client application 320 to receive an input associated with a movement of the first node to the second task 314. The notification may include consequences associated with a movement of the first node to the second task 314. The task modification engine may, in response to receiving an input of an approval the movement of the first node to the second task 314, move the first node to the second task 314 and executing the second task 314.

In some examples, the task modification engine may also filter 318 the tasks 310 based on the prioritization of the tasks 310. In other examples, the task modification engine may also filter 318 the tasks 310 based on a selection 321 by the target stakeholder. The selection 321 may include filtering the tasks 310 based on the target stakeholder, the source stakeholder, a persistence of the source stakeholder, a type of a meeting associated with the communication, and the communication in which the target stakeholder is mentioned, among others. The persistence of the source stakeholder may include a time period exceeded in which the target stakeholder fails to reply to the commination. In other examples, the task management application 312 may filter 318 the tasks 310 based on a deadline associated with the tasks 310.

In a further example, the task extraction engine may perform a historical trend analysis to analyze a history of the properties of the nodes 306. The properties may include a priority associated with the communication, a priority associated with the source stakeholder of the communication, a timestamp associated with the communication, a subject matter associated with the communication, and a type of an attachment associated with the communication, among others. The task modification engine may then perform the prioritization of the tasks 310 based on the history of the properties of the nodes 306. The task modification engine may also filter 318 the tasks 310 based on the prioritization. The task management application 308 may then display the tasks 310 on the task management interface 302.

Figure 4:
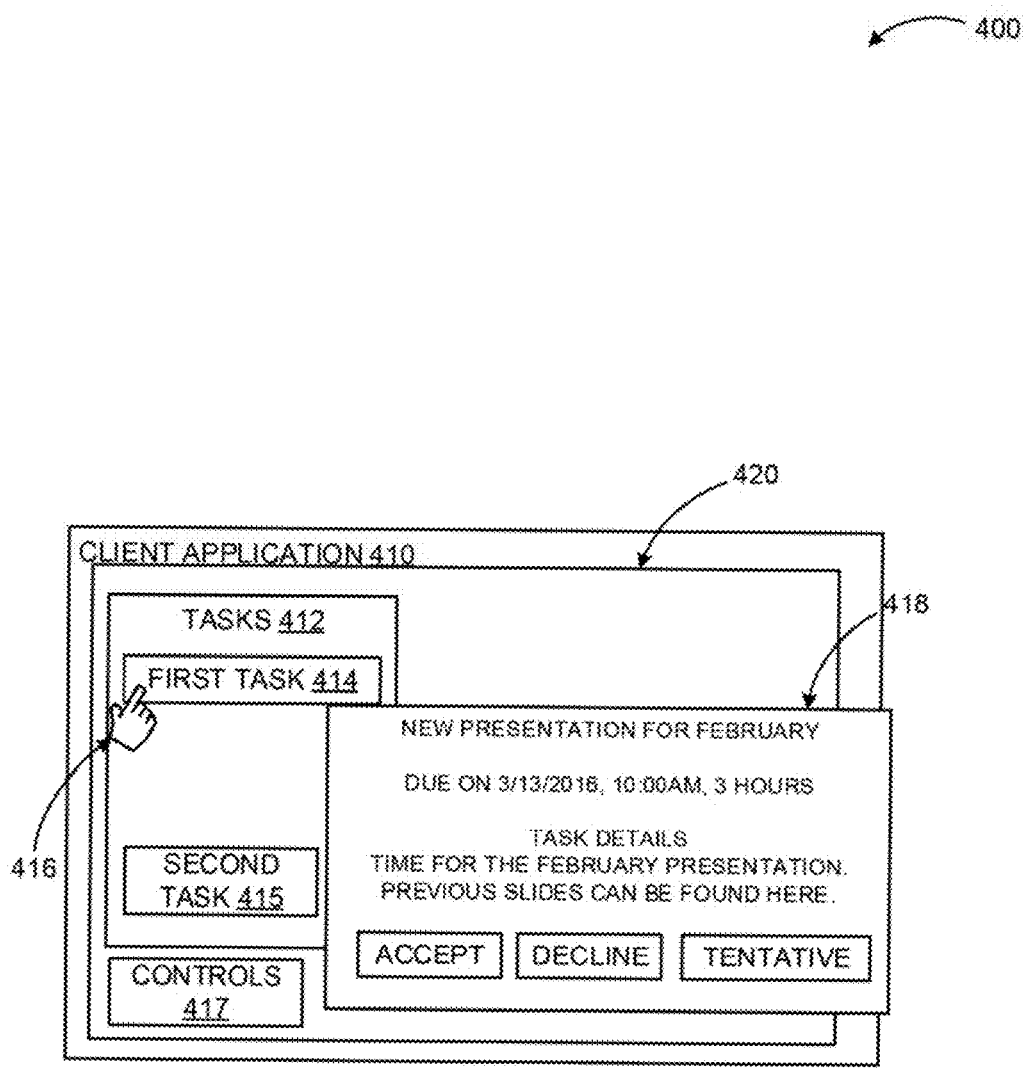
FIG. 4 is a display diagram illustrating a task management interface of a task management application for automatically extracting and completing tasks associated with a communication, according to embodiments.

FIG. 4 is a display diagram illustrating a task management interface of a task management application for automatically extracting and completing tasks associated with a communication, according to embodiments.

In a diagram 400, a task management application may provide a task management interface 420 to the client application 410. The task management interface 420 may be used to visualize the tasks 412. The task management interface 420 may display task data, the tasks 412, resources, and information associated with the tasks 412 to the target stakeholder associated with the client application 410. The tasks 412 may include a first task 414 and a second task 415. The first task 414 and the second task 415 may include titles to distinguish the tasks 412.

In some examples, the tasks 412 may be listed in a first status column hierarchically distinguished from the tasks 412 (or sub-tasks) in the same column. Other tasks may be displayed in a second status column and a third status column, following the same tree structure previously described. Summary tasks may also be displayed in the first status column, the second status column, and the third status column. A summary task may be defined as a task that has one or more children tasks. The summary tasks may have the children tasks that are themselves summary tasks. A child task may be any task that has no children reporting to it. The children tasks are also referred to as the sub-tasks herein.

The first status column, the second status column, and the third status column may be determined based on the selection, by the target stakeholder, of predefined status categories or by a definition from the target stakeholder for the categories. An automatic mapping may be performed to translate the fields to the status columns. For example, a zero in the percent complete field may be translated as "Not Started", any value between 1 and 99 may be translated as "In Progress", and a one hundred in the percent complete field may be translated as "Completed."

In other examples, the mapping of the task statues from project fields to the columns in the task management interface 420 of the task management application may occur through a predefined or stakeholder-specific filter. The predefined or stakeholder-specific filter may include rules. A rule may indicate, "the tasks with zero percent complete and starting less than today are to be placed in a column title To Do." An algorithm facilitating the transformation may evaluate each task within each summary task to determine the column the task fits in based on the filter (rule or combination of rules). In response to the evaluation of the tasks 412, a task extraction engine of the task management application may move the tasks 412 to the respective column. The columns may be determined by properties of the nodes used to generate the tasks and may be unrelated to the status of the task. For example, each task may have a field called "deadline week day", with values like "Monday", "Tuesday", etc. The fields and values associated with the tasks 412 may be displayed visually on the task management interface 420.

A task modification engine of the task management application may allow the target stakeholder to select 416 a subset of the tasks 412 (i.e. the first task 414) on the task management interface 420. In response to receiving a selection 416, for example, the task modification engine may display 418 task data, resources, and information associated with the first task 414 on the task management interface 420. The information may include the nodes associated with the subset of the tasks 412, the properties of the nodes associated with the subset of the tasks 412, and a deadline associated with the subset of the tasks 412. The information may be distinguished with a textual scheme, a graphical scheme, an audio scheme, an animation scheme, a coloring scheme, a highlighting scheme, and a shading scheme, among others. In some examples, the subset of the tasks 412 (i.e. the first task 414) may be selected 416 through use of a drop-down menu or a textual entry box, among others.

In some examples, the subset of the tasks 412 (i.e. the first task 414) may request an input. The task modification engine may receive the input associated with the subset of the tasks 412 (i.e. the first task 414). The input may include an approval of the subset of the tasks 412 (i.e. the first task 414), a dismissal of the subset of the tasks 412 (i.e. the first task 414), and a tentative approval of the subset of the tasks 412 (i.e. the first task 414), among others. The task modification engine of the task management application may detect the approval of the subset of the tasks 412 (i.e. the first task 414) as the input and may execute the subset of the tasks 412 (i.e. the first task 414). In another example, the task modification engine may detect the dismissal of the subset of the tasks 412 (i.e. the first task 414) as the input and may fail to execute the subset of the tasks 412 (i.e. the first task 414). In a further example, the task modification engine may detect the tentative approval of the subset of the tasks 412 (i.e. the first task 414) as the input. The task modification engine of the task management application may execute the subset of the tasks 412 (i.e. the first task 414) in response to meeting the deadline associated with the subset of the tasks 412 (i.e. the first task 414).

In some examples, the subset of the tasks 412 may be displayed using graphical objects and/or textual identification. Some or all of the displayed elements on the task management interface 420 may be actionable. The task management application may include controls 417 (graphical and/or textual control elements) on the task management interface 420 to allow the target stakeholder to perform actions on the subset of the tasks 412 (i.e. the first task 414). The actions may include editing, copying, moving, and scheduling of the tasks 412.

For example, the task management application may provide links to the controls 417 associated with setting parameters and/or modification parameters of the tasks 412. In some examples, the links may be associated with modifying view settings of the subset of the tasks 412 on the task management interface 420. In some examples, a timeline may be present on the task management application. The timeline may display a time and/or a date based temporal reference for the progress of the tasks 412 displayed.

The example scenarios and schemas in FIG. 1 through FIG. 4 are shown with specific components, data types, and configurations. Embodiments are not limited to systems according to these example configurations. Automatically extracting and completing tasks 412 associated with a communication may be implemented in configurations employing fewer or additional components in applications and user interfaces. Furthermore, the example schema and components shown in FIG. 1 through FIG. 4 and their subcomponents may be implemented in a similar manner with other values using the principles described herein.

Figure 5:
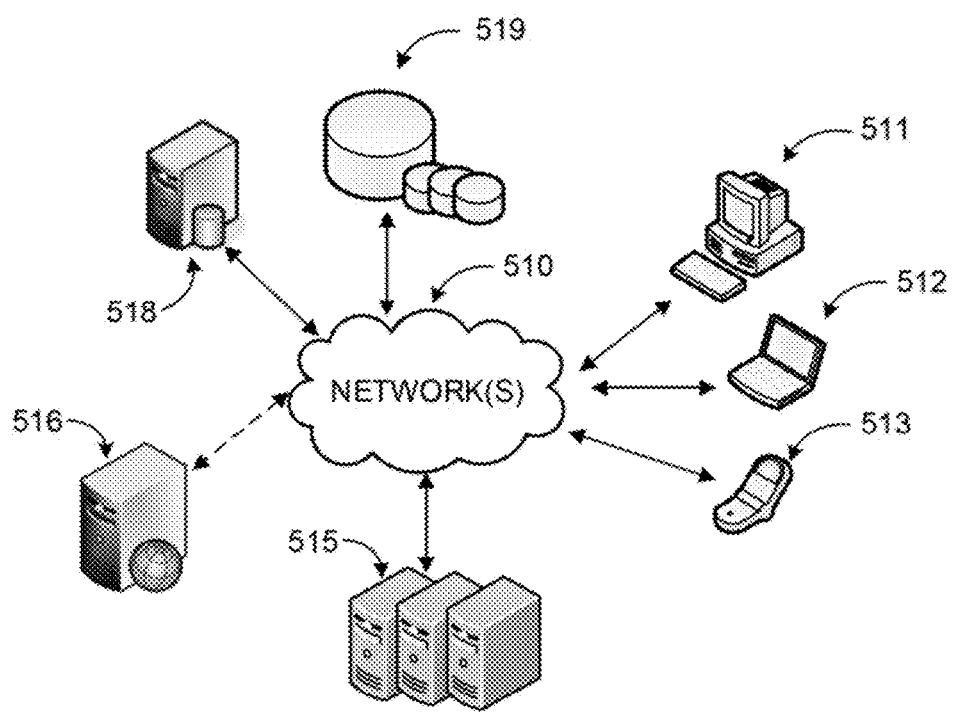
FIG. 5 is a simplified networked environment, where a system according to embodiments may be implemented.

FIG. 5 is a simplified networked environment, where a system according to embodiments may be implemented.

As shown in a diagram 500, operations such as prioritization of tasks based on properties of nodes and sorting the tasks based on the prioritization of the tasks, among others, may be performed by a task management application. In examples, the task management application may be implemented via software executed over the servers 514. The platform may communicate with client applications on individual computing devices such as a smart phone 513, a mobile computer 512, or desktop computer 511 ('client devices') through network(s) 510. The servers 514, may include one or more task management servers 516, where at least one of the one or more task management servers 516 may be configured to execute one or more applications (i.e. the task management application), among other applications. In other examples, the task management application may be provided by a third party service or may include a web application. The task management application may store data associated with project data in a data store 519 directly or through a database server 518. Client applications executed on client devices 511-513 may be enabled to automatically extract and complete tasks from a communication.

Client applications executed on any of the client devices 511-513 may facilitate communications via application(s) executed by the one or more task management servers 516, or on an individual task management server. An application, such as the task management application, may include a task extraction engine and a task modification engine. The task extraction engine may generate nodes based on properties extracted from a communication, generate tasks based on the nodes, and construct a graph based on the nodes and the tasks. In some examples, the task extraction engine may also process a qualification of a subset of the nodes to exceed a threshold to generate one of the tasks. The qualification may include a prior history associated with a completion of the task. The task extraction engine may also detect the qualification of the subset of the nodes exceeding the threshold.

The task modification engine may perform a prioritization of the tasks within the graph based on the properties of the nodes, order the tasks within the graph based on the prioritization of the tasks, and provide a task management interface to present the tasks within the graph. The task modification engine may also transmit the tasks within the graph to the task extraction engine in response to a modification input executed on the graph.

In other examples, the task modification engine may perform a historical trend analysis to analyze a history of the properties of the nodes. The properties may include a priority associated with the communication, a priority associated with a source of the communication, a timestamp associated with the communication, a subject matter associated with the communication, and a type of an attachment associated with the communication. The task modification engine may also perform the prioritization of the tasks based on the history of the properties of the nodes. The task management application may store task data associated with the tasks in the data store 519 directly or through database server 518.

The network(s) 510 may comprise any topology of servers, clients, Internet service providers, and communication media. A system according to embodiments may have a static or dynamic topology. The network(s) 510 may include secure networks such as an enterprise network, an unsecure network such as a wireless open network, or the Internet. The network(s) 510 may also coordinate communication over other networks such as Public Switched Telephone Network (PSTN) or cellular networks. Furthermore, the network(s) 510 may include short range wireless networks such as Bluetooth or similar ones. The network(s) 510 provide communication between the nodes described herein. By way of example, and not limitation, the network(s) 510 may include wireless media such as acoustic, RF, infrared and other wireless media.

A textual scheme, a graphical scheme, an audio scheme, an animation scheme, a coloring scheme, a highlighting scheme, and/or a shading scheme may be employed to further enhance interaction between the task data and the provided task management interface.

Many other configurations of computing devices, applications, data sources, and data distribution systems may be employed to automatically extract and complete tasks from the communication. Furthermore, the networked environments discussed in FIG. 5 are for illustration purposes only. Embodiments are not limited to the example applications, modules, or processes.

Figure 6:
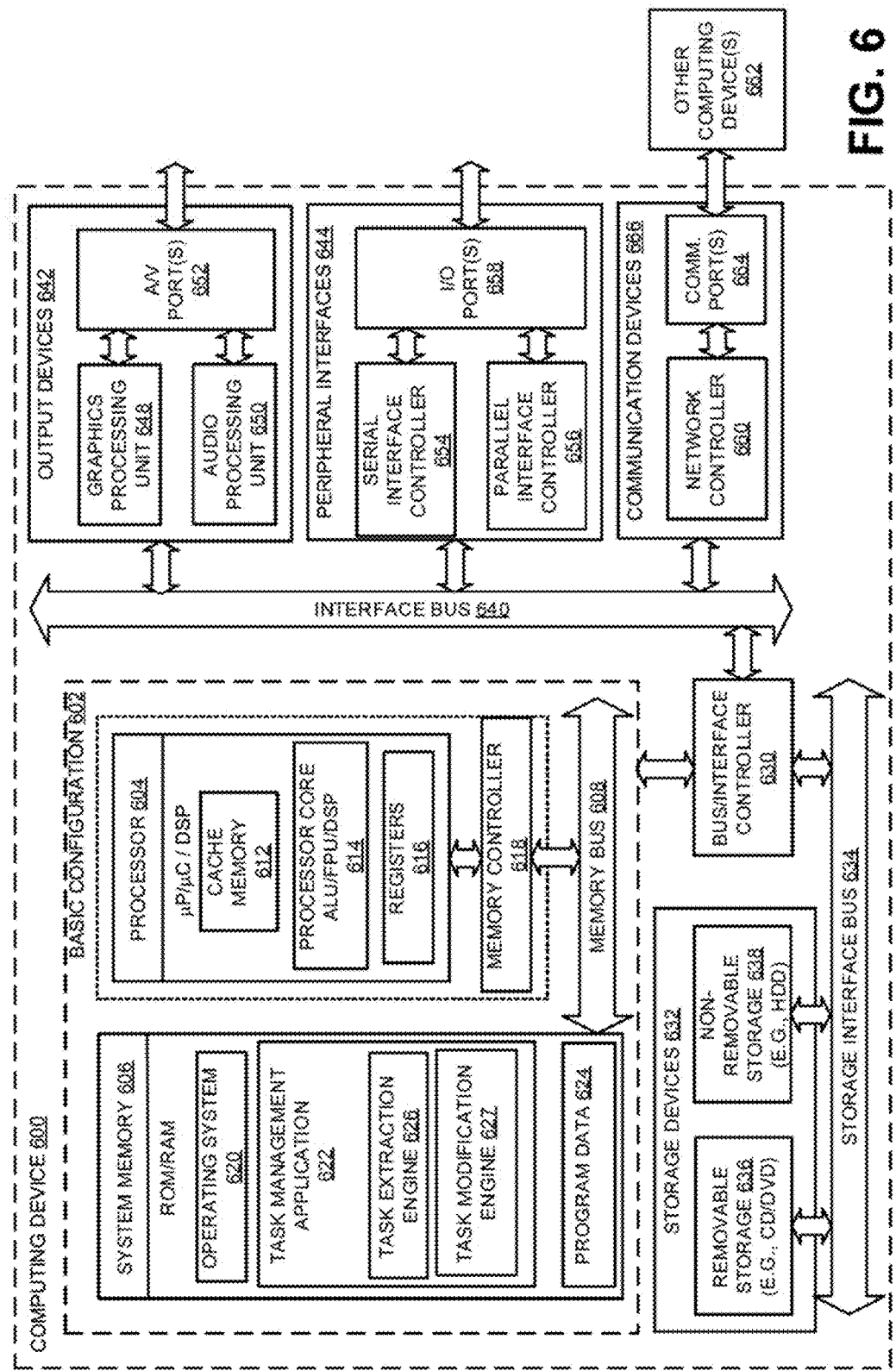
FIG. 6 is a block diagram of an example computing device, which may be used for automatically extracting and completing tasks associated with a communication, according to embodiments.

FIG. 6 is a block diagram of an example computing device, which may be used for automatically extracting and completing tasks associated with a communication, according to embodiments.

For example, a computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a task management application 622, and a program data 624. The task management application 622 may include a task extraction engine 626 and a task modification engine 627. The task extraction engine 626 may generate nodes based on properties extracted from a communication, generate tasks based on the nodes, and construct a graph based on the nodes and the tasks. In some examples, the task extraction engine may also process a qualification of a subset of the nodes to exceed a threshold to generate one of the tasks. The qualification may include a prior history associated with a completion of the task. The task extraction engine 626 may also detect the qualification of the subset of the nodes exceeding the threshold. In other examples, the task extraction engine 626 may modify a current state of the graph. For example, the task extraction engine 626 may modify the graph based on the nodes and the tasks. If the nodes and/or the tasks are not relevant to the graph, the nodes and/or the tasks may be deleted.

The task modification engine 627 may perform a prioritization of the tasks within the graph based on the properties of the nodes, order the tasks within the graph based on the prioritization of the tasks, and provide a task management interface to present the tasks within the graph. The task modification engine 627 may also transmit the tasks within the graph to the task extraction engine 626 in response to a modification input executed on the graph. In other examples, the task modification engine 627 may perform a historical trend analysis to analyze a history of the properties of the nodes. The properties may include a priority associated with the communication, a priority associated with a source of the communication, a timestamp associated with the communication, a subject matter associated with the communication, and a type of an attachment associated with the communication. The task modification engine 627 may also perform the prioritization of the tasks based on the history of the properties of the nodes.

The task management application 622 may utilize a networking device associated with the computing device 600 to interact with other devices, such a client application. The program data 624 may also include, among other data, the task data or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods for automatically extracting and completing tasks associated with the communication. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
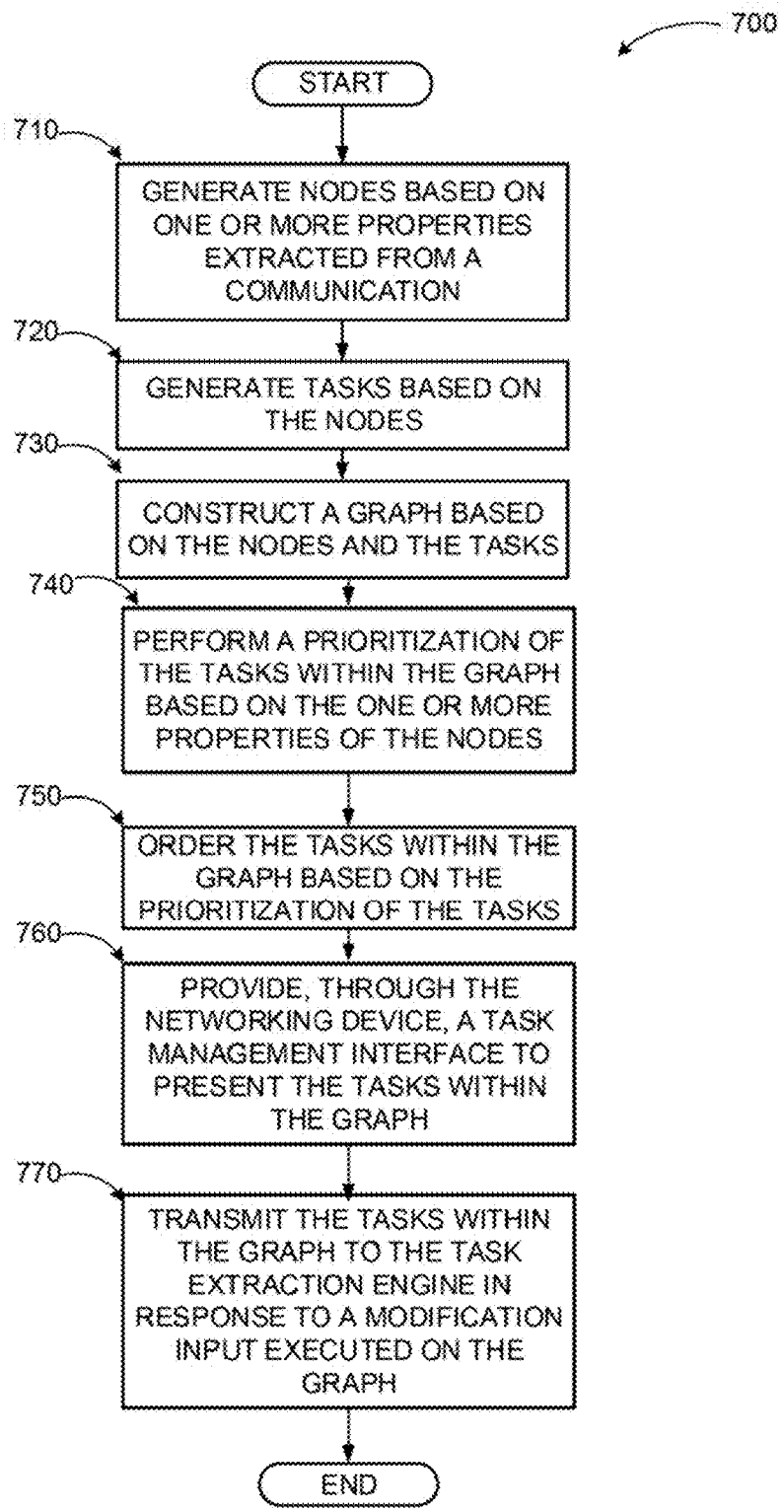
FIG. 7 is a logic flow diagram illustrating a process for automatically extracting and completing tasks associated with a communication, according to embodiments.

FIG. 7 is a logic flow diagram illustrating a process for automatically extracting and completing tasks associated with a communication, according to embodiments.

A process 700 may be implemented on a computing device, such as the computing device 600, or with another system. The computing device may include a networking device, a memory, and one or more processors coupled to the memory and the networking device. The one or more processors may execute a task management application in conjunction with instructions stored in the memory. The task management application may include a task extraction engine and a task modification engine, among others.

The process 700 begins with operation 710, where the task extraction engine may generate nodes based on properties extracted from a communication. At operation 720, the task extraction engine may generate tasks based on the nodes. In some examples, the task extraction engine may process a qualification of a subset of the nodes to exceed a threshold to generate one of the tasks. The qualification may include a prior history associated with a completion of the task. The task extraction engine may detect the qualification of the subset of the nodes exceeding the threshold. In response, the task extraction engine may wait for an allocation of the subset of the nodes to the task during a time period, detect the allocation of the subset of the nodes to the task during the time period, and generate the task based on the subset of the nodes. In other examples, the task extraction engine may generate the tasks based on one node. In further examples, the task extraction engine may generate default tasks based on zero nodes.

At operation 730, the task extraction engine may construct a graph based on the nodes and the tasks. At operation 740, the task modification engine may perform a prioritization of the tasks within the graph based on the properties of the nodes. In some examples, the task modification engine may perform a historical trend analysis to analyze a history of the properties of the nodes. The properties may include a priority associated with the communication, a priority associated with a source of the communication, a timestamp associated with the communication, a subject matter associated with the communication, and a type of an attachment associated with the communication. The task modification engine may also perform the prioritization of the tasks based on the history of the one or more properties of the nodes.

At operation 750, the task modification engine may order the tasks within the graph based on the prioritization of the tasks. In some examples, the task modification engine may order the tasks based on a deadline associated with the tasks. At operation 760, the task modification engine may provide, through the networking device, a task management interface to present the tasks within the graph. In some examples, the task modification engine may present a subset of the tasks on the task management interface. The subset of the tasks may request an input. The task modification engine may receive the input associated with the subset of the tasks. The input may include an approval of the subset of the tasks, a dismissal of the subset of the tasks, and a tentative approval of the subset of the tasks. In response to detecting the approval of the subset of the tasks as the input, the task modification engine may execute the subset of the tasks.

At operation 770, the task modification engine may transmit the tasks within the graph to the task extraction engine in response to a modification input executed on the graph. In examples, the task modification engine may detect a modification input, such as an edit action, executed on the graph. In some examples, the task modification engine may receive a feedback associated with the tasks. The task modification engine may transmit the graph to the task extraction engine, where the tasks may be customized based on the feedback.

The operations included in process 700 are for illustration purposes. Automatically extracting and completing tasks from a communication may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

A means for automatically extracting and completing tasks associated with a communication may be provided, which may include a means for generating nodes based on properties extracted from a communication, a means for generating tasks based on the nodes, a means for constructing a graph based on the nodes and the tasks, a means for performing a prioritization of the tasks within the graph based on the properties of the nodes, a means for ordering the tasks within the graph based on the prioritization of the tasks and a means for providing, through a networking device, a task management interface to present the tasks within the graph. The communication may include an email, an online calendar invite, an attachment associated with an email, and/or a text message, among other examples.

According to some embodiments, computing devices for automatically extracting and completing tasks associated with a communication are described. An example computing device may include a networking device, a memory, and processors coupled to the memory and the networking device. The processors may execute a task management application in conjunction with instructions stored in the memory. The task management application may include a task extraction engine and a task modification engine. The task extraction engine may be configured to generate nodes based on properties extracted from a communication, generate tasks based on the nodes, and construct a graph based on the nodes and the tasks. The task modification engine may be configured to perform a prioritization of the tasks within the graph based on the properties of the nodes, order the tasks within the graph based on the prioritization of the tasks, and provide, through the networking device, a task management interface to present the tasks within the graph. The task modification engine may also be configured to transmit the tasks within the graph to the task extraction engine in response to a modification input executed on the graph.

In other examples, the task modification engine may be further configured to perform a historical trend analysis to analyze a history of the properties of the nodes. The properties may include a priority associated with the communication, a priority associated with a source of the communication, a timestamp associated with the communication, a subject matter associated with the communication, and/or a type of an attachment associated with the communication. The task modification engine may be further configured to perform the prioritization of the tasks based on the history of the properties of the nodes.

In further examples, the task modification engine may be further configured to order the tasks based on a deadline associated with the tasks and present a first subset of the tasks on the task management interface. The first subset of the tasks may request an input. The task modification engine may be configured to receive the input associated with the first subset of the tasks. The input may include an approval of the first subset of the tasks, a dismissal of the first subset of the tasks, or a tentative approval of the first subset of the tasks.

In some examples, the task modification engine may detect the approval of the first subset of the tasks as the input and may execute the first subset of the tasks. In other examples, the task modification engine may detect the dismissal of the first subset of the tasks as the input and may fail to execute the first subset of the tasks. In further examples, the task modification engine may detect the tentative approval of the first subset of the tasks as the input and may execute the first subset of the tasks in response to meeting the deadline associated with the first subset of the tasks.

In other examples, the task modification engine may be further configured to receive a feedback associated with a first subset of the tasks and/or the prioritization of the first subset of the tasks. In response, the task modification engine may customize the first subset of the tasks and/or the prioritization of the first subset of the tasks based on the feedback. In further examples, the task modification engine may present information associated with a first subset of the tasks. The information associated with the first subset of the tasks may include the nodes associated with the first subset of the tasks, the properties of the nodes associated with the first subset of the tasks, and/or a deadline associated with the first subset of the tasks. The information may be distinguished with a textual scheme, a graphical scheme, an audio scheme, an animation scheme, a coloring scheme, a highlighting scheme, and/or a shading scheme.

In other examples, the task modification engine may be further configured to process a qualification of a subset of the nodes to exceed a threshold to generate one of the tasks. The qualification may include a prior history associated with a completion of the task. The task modification engine may be further configured to detect the qualification of the subset of the nodes exceeding the threshold. In some examples, the task modification engine may be further configured to wait for an allocation of the subset of the nodes to the task during a time period and may detect the allocation of the subset of the nodes to the task during the time period. The task modification engine may generate the task based on the subset of the nodes and may transmit an alert to the task management interface to indicate a creation of the task.

In some examples, the task extraction engine may be further configured to wait for an allocation of the subset of the nodes to the task during a time period, detect the allocation of the subset of the nodes to the task during the time period, prevent the subset of the nodes from being allocated to another task during the time period, and prevent the subset of the nodes from overlapping with another task during the time period. The task extraction engine may be further configured to generate the task based on the subset of the nodes and transmit an alert to the task management interface to indicate a creation of the task.

According to some embodiments, methods executed on computing devices for automatically extracting and completing tasks associated with a communication may be provided. An example method may include process steps, such as, generating nodes based on properties extracted from a communication, generating tasks based on the nodes, constructing a graph based on the nodes and the tasks, performing a prioritization of the tasks within the graph based on the properties of the nodes, ordering the tasks within the graph based on the prioritization of the tasks, and providing, through a networking device, a task management interface to present the tasks within the graph. The communication may include an email, an online calendar invite, an attachment associated with an email, and/or a text message.

According to some examples, the method may further include processes for forming a verification process during the generation of the tasks to determine if a first node associated with a first task is additionally allocated to a second task. In response to a determination from the verification process that the first node is allocated to the second task, the method may further include processes to release the first node from the second task. In other examples, the method may include processes to detect a completion of the first task and may re-assign the first node to the second task.

In other examples, the method may further include processes for receiving a move request to move a first node associated with a first task to a second task, determining that the first node meets a threshold for creation of a first task, and transmitting a notification to the task management interface to receive an input associated with a movement of the first node to the second task. The notification may include consequences associated with a movement of the first node to the second task. In response to receiving an input of an approval the movement of the first node to the second task, the method may further include processes for moving the first node to the second task and executing the second task.

According to some examples, computer-readable memory devices with instructions stored thereon for automatically extracting and completing tasks associated with a communication may be provided. An example computer-readable memory device with instructions stored thereon for automatically extracting and completing tasks associated with a communication may include instructions for generating nodes based on properties extracted from a communication, generating tasks based on the nodes, constructing a graph based on the nodes and the tasks, performing a prioritization of the tasks within the graph based on the properties of the nodes, ordering the tasks within the graph based on the prioritization of the tasks, and providing a task management interface to present the tasks within the graph. The communication may include email, an online calendar invite, an attachment associated with an email, and/or a text message.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for automatically extracting and completing tasks associated with a communication, the computing device comprising:
 a memory; and
 one or more processors coupled to the memory, the one or more processors executing a task management application in conjunction with instructions stored in the memory, wherein the one or more processors are configured to:
  receive a communication from a communication source and extract one or more properties of the communication from the communication, the one or more properties including a priority associated with the communication or the communication source, a timestamp, a subject matter, or a type of an attachment associated with the communication;
  construct nodes in a graph representing the various extracted properties of the communication;
  detect one or more of a text, linguistic phrase, or keyword in the nodes representing the extracted properties of the communication in the graph;
  associate at least some of the constructed nodes in the graph with other nodes based on the detected one or more of the text, linguistic phrase, or keyword into a single task to be performed by a user;
  determine a priority of the task among other tasks within the graph based on at least one of the one or more properties of the communication; and
  order the task among the other tasks within the graph based on the determined priority; and
  transmit, via a computer network, data representing the task to be displayed on a client device as being ordered among the other tasks within the graph based on the determined priority, thereby reducing processing usage of the computing device and network bandwidth usage of the computer network by avoiding repeated task assignment.

2. The computing device of claim 1, wherein the one or more processors are further configured to:
 perform a historical trend analysis to analyze a history of the one or more properties of the communication; and
 determine the priority of the task among the other tasks based on the history of the one or more properties of the communication.

3. The computing device of claim 1, wherein the one or more processors are further configured to:
 order the task among the other tasks based on a deadline associated with the task;
 provide for display a subset of tasks including one or more of the task and the other tasks within the graph, wherein the subset of the tasks request an input; and
 receive the input associated with the subset of the tasks, wherein the input includes one of an approval of the subset of the tasks, a dismissal of the subset of the tasks, or a tentative approval of the subset of the tasks.

4. The computing device of claim 3, wherein the one or more processors are further configured to:
 detect the approval of the subset of the tasks as the input; and
 execute the subset of the tasks.

5. The computing device of claim 3, wherein the one or more processors are further configured to:
 detect the dismissal of the subset of the tasks as the input; and
 fail to execute the subset of the tasks.

6. The computing device of claim 3, wherein the one or more processors are further configured to:
 detect the tentative approval of the subset of the tasks as the input; and
 execute the subset of the tasks in response to meeting a deadline associated with the subset of the tasks.

7. The computing device of claim 1, wherein the one or more processors are further configured to:
 receive a feedback associated with the task; and
 customize one or more of the subset of the tasks and the order of the subset of the tasks within the graph based on the received feedback.

8. The computing device of claim 1, wherein the one or more processors are further configured to:
 in response to a target stakeholder selection of the task, provide for display information associated with the subset of tasks.

9. The computing device of claim 8, wherein the information is distinguished with one or more of a textual scheme, a graphical scheme, an audio scheme, an animation scheme, a coloring scheme, a highlighting scheme, and a shading scheme.

10. A method executed on a computing device for automatically extracting and completing tasks associated with a communication, the computing device being connected to a client device via a computer network, wherein the method comprising:

upon receiving a communication to a user from a communication source, extracting one or more properties of the received communication, the one or more properties including a priority associated with the communication or the communication source, a timestamp, a subject matter, or a type of an attachment contained in the communication;

constructing one or more nodes in a graph based on and representing the extracted properties of the received communication, the constructed one or more nodes and other nodes in the graph individually being associated with one or more of a text, linguistic phrase, or keyword;

associating at least one of the constructed nodes in the graph with one or more other nodes in the graph based on the one or more of the text, linguistic phrase, or keyword associated with the individual nodes into a single task to be performed by a user; and transmitting data representing the task to be presented and acted on a client device by the user, thereby reducing processing usage of the computing device and network bandwidth usage of the computer network by avoiding repeated task assignment.

11. The method of claim 10, further comprising:
receiving the communication from the communication source, the communication including one of an email, a calendar invite, a text message, or an instant message.

12. The method of claim 10, further comprising:
performing a historical trend analysis to analyze a history of the one or more properties of the communication; and
determining a priority of the task among the other tasks based on the history of the one or more properties of the communication.

13. The method of claim 10, further comprising:
subsequent to transmitting data representing the task, receiving, from the user, an input associated with the displayed task, wherein the input includes one of an approval, a dismissal, or a tentative approval of the task.

14. The method of claim 10, further comprising:
subsequent to transmitting data representing the task, receiving, from the user, an input representing approval of the task; and
in response to receiving the input, executing the task at the computing device.

15. The method of claim 10, further comprising:
subsequent to transmitting data representing the task, receiving, from the user, an input representing a tentative approval of the task; and
in response to receiving the input, executing the task in response to meeting a deadline associated with the task.

16. The method of claim 10, further comprising:
subsequent to transmitting data representing the task, receiving, from the user, a feedback associated with the task; and
in response to receiving the feedback, customizing the task and/or an order of the task within the graph based on the received feedback.

17. A computing device for automatically extracting and completing tasks associated with a communication, the computing device being connected to a client device via a computer network, wherein the computing device comprising:

a processor; and
a memory containing instructions executable by the processor to cause the computing device to:

upon receiving a communication to a user from a communication source, extract one or more properties of the received communication, the one or more properties including a priority associated with the communication or the communication source, a timestamp, a subject matter, or a type of an attachment contained in the communication;

generate one or more nodes in a graph based on and representing the extracted properties of the received communication, the generated one or more nodes and other nodes in the graph individually being associated with one or more of a text, linguistic phrase, keyword, or metadata property;

associate at least one of the constructed nodes in the graph with one or more other nodes in the graph based on the one or more of the text, linguistic phrase, keyword, or metadata property associated with the individual nodes into a single task to be performed by a user; and transmit data representing the task to be presented and acted on a client device by the user, thereby reducing usage of the processor and network bandwidth usage of the computer network by avoiding repeated task assignment.

18. The computing device of claim 17, wherein the memory contains additional instructions executable by the processor to cause the processor to
perform a historical trend analysis to analyze a history of the one or more properties of the communication;
determine a priority of the task among the other tasks based on the history of the one or more properties of the communication; and
order the task among the other tasks according to the determined priority of the task.

19. The computing device of claim 17, wherein the memory contains additional instructions executable by the processor to cause the processor to:
provide a control for selection by the user to perform one or more actions on the task, the one or more actions including editing, copying, moving, or scheduling.

20. The computing device of claim 17, wherein the memory contains additional instructions executable by the processor to cause the processor to:
provide a timeline in conjunction with the graph for display to the user on the client device, wherein the timeline provides a temporal reference for a progress of the task.

* * * * *